(12) United States Patent
Chu et al.

(10) Patent No.: US 10,451,864 B2
(45) Date of Patent: Oct. 22, 2019

(54) MICROFLUIDIC COLOR FILTER, DISPLAY PANEL, DISPLAY APPARATUS, AND METHOD OF CONTROLLING A DISPLAY PANEL

(71) Applicants: BOE TECHNOLOGY GROUP CO., LTD., Beijing (CN); Beijing BOE Display Technology Co., Ltd., Beijing (CN)

(72) Inventors: Hui Chu, Beijing (CN); Ming Chen, Beijing (CN); Shou Li, Beijing (CN); Chao Zhang, Beijing (CN); Jieqiong Wang, Beijing (CN)

(73) Assignees: BOE TECHNOLOGY GROUP CO., LTD., Beijing (CN); Beijing BOE Display Technology Co., Ltd., Beijing (CN)

( * ) Notice: Subject to any disclaimer, the term of this patent is extended or adjusted under 35 U.S.C. 154(b) by 0 days.

(21) Appl. No.: 15/769,480

(22) PCT Filed: May 8, 2017

(86) PCT No.: PCT/CN2017/083440
§ 371 (c)(1),
(2) Date: Apr. 19, 2018

(87) PCT Pub. No.: WO2018/205088
PCT Pub. Date: Nov. 15, 2018

(65) Prior Publication Data
US 2019/0072755 A1   Mar. 7, 2019

(51) Int. Cl.
*G02B 26/00* (2006.01)
*G02F 1/167* (2019.01)
(Continued)

(52) U.S. Cl.
CPC .......... *G02B 26/004* (2013.01); *G02F 1/167* (2013.01); *G09G 3/2003* (2013.01); *G09G 3/348* (2013.01)

(58) Field of Classification Search
CPC .... G02B 26/004; G02F 1/167; G09G 3/2003; G09G 3/348
See application file for complete search history.

(56) References Cited

U.S. PATENT DOCUMENTS

| 6,037,955 A | 3/2000 | DeBoer et al. |
| 2006/0198422 A1 | 9/2006 | Chopra et al. |

(Continued)

FOREIGN PATENT DOCUMENTS

| CN | 101075057 A | 11/2007 |
| CN | 103558685 A | 2/2014 |

OTHER PUBLICATIONS

International Search Report & Written Opinion dated Feb. 7, 2018, regarding PCT/CN2017/083440.

*Primary Examiner* — Peter D McLoone
(74) *Attorney, Agent, or Firm* — Intellectual Valley Law, P.C.

(57) ABSTRACT

The present application discloses a microfluidic color filter having an array of a plurality of microfluidic color filter units. The microfluidic color filter includes a plurality of micro-chambers; and a plurality of micro-channels. Each of the plurality of microfluidic color filter units includes one of the plurality of micro-chambers; and at least two of the plurality of micro-channels respectively connected to the one of the plurality of micro-chambers. The at least two of the plurality of micro-channels are configured to provide fluids of different colors to the one of the plurality of micro-chambers. A color of each of the plurality of microfluidic color filter units is based on amounts of fluids of (Continued)

different colors provided to the one of the plurality of micro-chambers.

16 Claims, 2 Drawing Sheets

(51) Int. Cl.
*G09G 3/34* (2006.01)
*G09G 3/20* (2006.01)

(56) References Cited

U.S. PATENT DOCUMENTS

| | | |
|---|---|---|
| 2007/0242032 A1 | 10/2007 | Cortenraad et al. |
| 2009/0086064 A1 | 4/2009 | Mackey |
| 2013/0208339 A1 | 8/2013 | Henzen et al. |
| 2016/0274352 A1 | 9/2016 | Wang et al. |

MICROFLUIDIC COLOR FILTER, DISPLAY PANEL, DISPLAY APPARATUS, AND METHOD OF CONTROLLING A DISPLAY PANEL

CROSS-REFERENCE TO RELATED APPLICATION

This application is a national stage application under 35 U.S.C. § 371 of International Application No. PCT/CN2017/083440 filed May 8, 2017, the contents of which are incorporated by reference in the entirety.

TECHNICAL FIELD

The present invention relates to display technology, more particularly, to a microfluidic color filter, a display panel and a display apparatus having the same, and a method of controlling a display panel.

BACKGROUND

Microfluidics deals with the behavior, precise control, and manipulation of fluids that are geometrically constrained to a small, typically sub-millimeter, scale. It is a multidisciplinary field at the intersection of engineering, physics, chemistry, nanotechnology, and biotechnology. A microfluidic chip refers to a system or device having micro-channels or micro-chambers that are generally fabricated on a substrate. The length scale of the micro-channels and micro-chambers is typically on the micron or submicron scale. For example, the micro-channels and the micro-chambers typically have at least one cross-sectional dimension in the range of approximately 0.1 micron to approximately 1000 microns, e.g., approximately 0.1 micron to approximately 500 microns.

SUMMARY

In one aspect, the present invention provides a microfluidic color filter having an array of a plurality of microfluidic color filter units, comprising a plurality of micro-chambers; and a plurality of micro-channels; wherein each of the plurality of microfluidic color filter units comprises one of the plurality of micro-chambers; and at least two of the plurality of micro-channels respectively connected to the one of the plurality of micro-chambers; wherein the at least two of the plurality of micro-channels are configured to provide fluids of different colors to the one of the plurality of micro-chambers; and a color of each of the plurality of microfluidic color filter units is based on amounts of fluids of different colors provided to the one of the plurality of micro-chambers.

Optionally, the microfluidic color filter further comprises a plurality of pairs of positively charged and negatively charged micro-electrodes configured to respectively provide electroosmotic forces sufficient to cause flow of fluids in the plurality of micro-channels; wherein each of the plurality of microfluidic color filter units further comprises at least two pairs of the plurality of pairs of positively charged and negatively charged micro-electrodes; and the at least two pairs of the plurality of pairs of positively charged and negatively charged micro-electrodes are configured to control the amounts of fluids of different colors respectively provided from the at least two of the plurality of micro-channels to the one of the plurality of micro-chambers.

Optionally, each of the plurality of microfluidic color filter units comprises a plurality of micro-pumps configured to respectively provide pressures sufficient to cause flow of fluids in the plurality of micro-channels; wherein each of the plurality of microfluidic color filter units further comprises at least two micro-pumps of the plurality of micro-pumps; and the at least two micro-pumps of the plurality of micro-pumps are configured to control the amounts of fluids of different colors respectively provided from the at least two of the plurality of micro-channels to the one of the plurality of micro-chambers.

Optionally, each of the plurality of microfluidic color filter units comprises a single one of the plurality of micro-chambers; and a first micro-channel, a second micro channel, and a third micro channel of the plurality of micro-channels, the first micro-channel, the second micro channel, and the third micro channel being configured to be respectively connected to the single one of the plurality of micro-chambers; wherein the first micro-channel is configured to provide a first amount of a first fluid of a first color to the single one of the plurality of micro-chambers; the second micro-channel is configured to provide a second amount of a second fluid of a second color to the single one of the plurality of micro-chambers; the third micro-channel is configured to provide a third amount of a third fluid of a third color to the single one of the plurality of micro-chambers; and a color of each of the plurality of microfluidic color filter units is based on the first amount, the second amount, and the third amount.

Optionally, each of the plurality of microfluidic color filter units further comprises a first pair of micro-electrodes, a second pair of micro-electrodes, and a third pair of micro-electrodes of the plurality of pairs of positively charged and negatively charged micro-electrodes; wherein the first pair of micro-electrodes is configured to control the first amount of the first fluid of the first color provided from the first micro-channel to the single one of the plurality of micro-chambers; the second pair of micro-electrodes is configured to control the second amount of the second fluid of the second color provided from the second micro-channel to the single one of the plurality of micro-chambers; and the third pair of micro-electrodes is configured to control the third amount of the third fluid of the third color provided from the third micro-channel to the single one of the plurality of micro-chambers.

Optionally, each of the plurality of microfluidic color filter units further comprises a first micro-pump, a second micro-pump, and a third micro-pump of the plurality of micro-pumps; wherein the first micro-pump is configured to control the first amount of the first fluid of the first color provided from the first micro-channel to the single one of the plurality of micro-chambers; the second micro-pump is configured to control the second amount of the second fluid of the second color provided from the second micro-channel to the single one of the plurality of micro-chambers; and the third micro-pump is configured to control the third amount of the third fluid of the third color provided from the third micro-channel to the single one of the plurality of micro-chambers.

Optionally, each of the plurality of microfluidic color filter units further comprises a fourth micro-channel connected to the single one of the plurality of micro-chambers and configured to provide a transparent fluid to the single one of the plurality of micro-chambers.

Optionally, each of the plurality of microfluidic color filter units further comprises a fourth pair of micro-electrodes of the plurality of pairs of positively charged and negatively charged micro-electrodes configured to control a fourth amount of the transparent fluid provided from the fourth micro-channel to the single one of the plurality of micro-chambers.

Optionally, the microfluidic color filter further comprises a transparent base substrate, and a microfluidic chip on the transparent base substrate connected to the plurality of micro-channels.

Optionally, the microfluidic color filter further comprises a recycling device configured to separate a mixture of the fluids of different colors into separated fluids of different colors; wherein the separated fluids of different colors are recycled in providing at least one of fluids of different colors to the one of the plurality of micro-chambers.

Optionally, the first color, the second color, and the third color are three different colors selected from red, green, and blue.

Optionally, the first fluid of the first color comprises iron(III) thiocyanate; the second fluid of the second color comprises ferrous iron; and the third fluid of the third color comprises copper(II) ion.

In another aspect, the present invention provides a display panel having a plurality of pixels, comprising a microfluidic color filter described herein; and an array substrate facing the microfluidic color filter; wherein each of the plurality of pixels comprising a single one of the plurality of microfluidic color filter units.

In another aspect, the present invention provides a display apparatus comprising the display panel described herein.

In another aspect, the present invention provides a method of controlling a display panel having a plurality of pixels, comprising providing a plurality of micro-chambers in an image display area of the display panel, each of the plurality of pixels comprising one of the plurality of micro-chambers; and providing at least one of fluids of different colors to the one of the plurality of micro-chambers; wherein a color of light emitted from the one of the plurality of pixels corresponding to the one of the plurality of micro-chambers is based on amounts of fluids of different colors provided to the one of the plurality of micro-chambers.

Optionally, the fluids of different colors comprise a first fluid of a first color, a second fluid of a second color, and a third fluid of a third color; providing at least one of fluids of different colors comprises controlling a first amount of the first fluid of the first color provided to the one of the plurality of micro-chambers; controlling a second amount of the second fluid of the second color provided to the one of the plurality of micro-chambers; and controlling a third amount of the third fluid of the third color provided to the one of the plurality of micro-chambers; wherein a color of light emitted from the one of the plurality of pixels corresponding to the one of the plurality of micro-chambers is based on the first amount, the second amount, and the third amount.

Optionally, the first fluid, the second fluid, and the third fluid are respectively dispensed into the one of the plurality of micro-chambers by electroosmotic flow.

Optionally, controlling the first amount of the first fluid comprises providing the first fluid of the first color through a first micro-channel connected to the one of the plurality of micro-chambers, and applying a first electrical field to the first micro-channel to control the first amount by electroosmotic flow; controlling the second amount of the second fluid comprises providing the second fluid of the second color through a second micro-channel connected to the one of the plurality of micro-chambers, and applying a second electrical field to the second micro-channel to control the second amount by electroosmotic flow; and controlling the third amount of the third fluid comprises providing the third fluid of the third color through a third micro-channel connected to the one of the plurality of micro-chambers, and applying a third electrical field to the third micro-channel to control the third amount by electroosmotic flow.

Optionally, the method further comprises receiving a data signal; converting the data signal to a first electrical signal, a second electrical signal, and a third electrical signal; applying the first electrical signal to a first pair of micro-electrodes to generate the first electrical field in the first micro-channel; applying the second electrical signal to a second pair of micro-electrodes to generate the second electrical field in the second micro-channel; and applying the third electrical signal to a third pair of micro-electrodes to generate the third electrical field in the third micro-channel.

Optionally, controlling the first amount of the first fluid comprises providing the first fluid of the first color through a first micro-channel connected to the one of the plurality of micro-chambers, and applying a first pressure to the first micro-channel to control the first amount; controlling the second amount of the second fluid comprises providing the second fluid of the second color through a second micro-channel connected to the one of the plurality of micro-chambers, and applying a second pressure to the second micro-channel to control the second amount; and controlling the third amount of the third fluid comprises providing the third fluid of the third color through a third micro-channel connected to the one of the plurality of micro-chambers, and applying a third pressure to the third micro-channel to control the third amount.

Optionally, the method further comprises receiving a data signal; converting the data signal to a first electrical signal, a second electrical signal, and a third electrical signal; applying the first electrical signal to a first micro-pump to generate the first pressure in the first micro-channel; applying the second electrical signal to a second micro-pump to generate the second pressure in the second micro-channel; and applying the third electrical signal to a third micro-pump to generate the third pressure in the third micro-channel.

Optionally, the display panel is configured to display a first frame of image and a second frame of image; the one of the plurality of pixels corresponding to the one of the plurality of micro-chambers is configured to emit light of different colors in the first frame of image and the second frame of image; and the amounts of fluids of different colors provided to the one of the plurality of micro-chambers have a first ratio in the first frame of image and a second ratio in the second frame of image.

Optionally, subsequent to the first frame of image and prior to the second frame of image, the method further comprising discharging fluids provided to the one of the plurality of micro-chambers during the first frame of image.

Optionally, the fluids provided to the one of the plurality of micro-chambers during the first frame of image are a mixture of the fluids of different colors; the method further comprising separating the mixture of the fluids of different colors into separated fluids of different colors; and recycling the separated fluids of different colors in providing at least one of fluids of different colors to the one of the plurality of micro-chambers.

Optionally, separating the mixture of the fluids of different colors is performed by ion separation to separate ions having different colors.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

In conventional display panels, color image display is realized by mixing three primary colors, e.g., red, green, and blue. In the conventional display panels, each pixel typically includes at least three subpixels of different colors. Accordingly, it is required to have three color filter blocks of different colors for each pixel, and three driving circuits respectively for driving light emission of three subpixels. Image display resolution is limited in the conventional display panels, and power consumption is relatively high as each subpixel is individually driven by a different driving circuit. Moreover, a black matrix layer is required to separate adjacent subpixels of different colors, leading to a complicated fabricating process. The quality of the black matrix layer has a significant impact on the resolution and color truth-ness.

Accordingly, the present disclosure provides, inter alia, a microfluidic color filter, a display panel and a display apparatus having the same, and a method of controlling a display panel that substantially obviate one or more of the problems due to limitations and disadvantages of the related art. In one aspect, the present disclosure provides a microfluidic color filter having an array of a plurality of microfluidic color filter units. In some embodiments, the microfluidic color filter includes a plurality of micro-chambers; and a plurality of micro-channels. Optionally, each of the plurality of microfluidic color filter units includes one of the plurality of micro-chambers; and at least two of the plurality of micro-channels configured to be connected to the one of the plurality of micro-chambers. Optionally, the at least two of the plurality of micro-channels are configured to provide amounts of fluids of different colors to the one of the plurality of micro-chambers. A color of each of the plurality of microfluidic color filter units is based on the amounts of fluids of different colors provided to the one of the plurality of micro-chambers.

Figure 1:
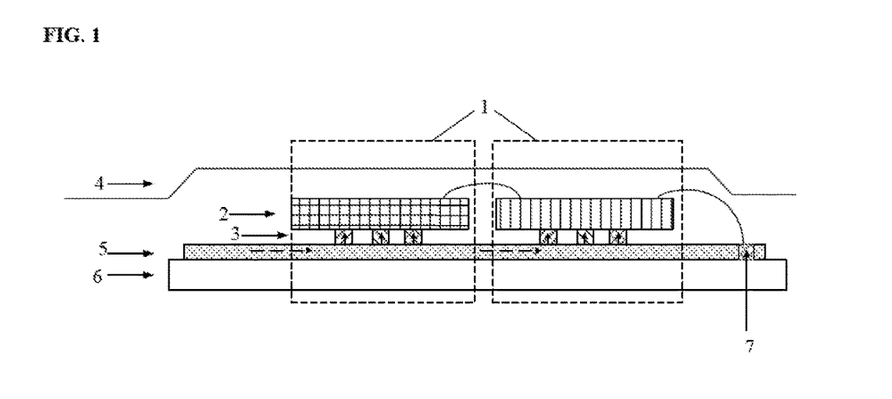
FIG. 1 is a schematic diagram illustrating the structure of a microfluidic color filter in some embodiments according to the present disclosure.

FIG. 1 is a schematic diagram illustrating the structure of a microfluidic color filter in some embodiments according to the present disclosure. Referring to FIG. 1, the microfluidic color filter in some embodiments includes a plurality of microfluidic color filter units 1. In some embodiments, the microfluidic color filter includes a plurality of micro-chambers 2 and a plurality of micro-channels 3. The plurality of micro-channels 3 are configured to provide fluids of different colors to the plurality of micro-chambers 2. In some embodiments, each one of the plurality of microfluidic color filter units 1 provides color filtering for a pixel in a corresponding display panel. Fluids of different colors may be provided to each of the plurality of microfluidic color filter units 1 in differing ratios. For example, when a pixel corresponding to one of the plurality of microfluidic color filter units 1 is configured to emit light of cyan color, a fluid of green color and a fluid of blue color may be provided to the one of the plurality of micro-chambers 2 in a certain ratio, e.g., a 1:1 ratio. In another example, when a pixel corresponding to one of the plurality of microfluidic color filter units 1 is configured to emit light of yellow color, a fluid of green color and a fluid of red color may be provided to the one of the plurality of micro-chambers 2 in a certain ratio, e.g., a 1:1 ratio. In another example, when a pixel corresponding to one of the plurality of microfluidic color filter units 1 is configured to emit light of red color, a fluid of red color may be provided to the one of the plurality of micro-chambers 2, without mixing with fluids of other colors. When a plurality of fluids of different colors are provided to the one of the plurality of microfluidic color filter units 1, they are mixed inside the one of the plurality of microfluidic color filter units 1. The display panel having the microfluidic color filter may be configured to display a plurality of frame of images. A pixel in the display panel may be configured to emit light of different colors in two consecutive frames of image. When the display of a present frame of image is complete in the pixel, the fluids (e.g., a mixture of fluids of different colors) in the one of the plurality of micro-chambers 2 corresponding to the pixel is driven out of the one of the plurality of micro-chambers 2, prior to the display of the next frame of image.

The present microfluidic color filter provides dynamic color filtering in a display panel. In the display panel having the present microfluidic color filter, it is not required to have three or more subpixels of different colors for realizing color image display. In some embodiments, each pixel contains only a single one of the plurality of microfluidic color filter units 1, e.g., a single one of the plurality of micro-chambers 2. Color filtering provided by the microfluidic color filter may be dynamically changed between frames of images. Thus, a higher resolution of image display may be realized in the display panel having the present microfluidic color filter as compared to conventional display panels. Moreover, because the pixel does not include a plurality of subpixels, a black matrix layer is not required to separate adjacent subpixels as in the case of a conventional display panel. As a result, a much-improved aperture ratio can be achieved in the display panel having the present microfluidic color filter.

Fluids of different colors may be driven in and out of the plurality of micro-chambers 2 by various appropriate methods. In some embodiments, fluids of different colors may be driven in and out of the plurality of micro-chambers 2 by mechanical or electrical methods. Optionally, the microfluidic color filter further includes a plurality of micro-pumps configured to control amounts of fluids of different colors respectively provided to the plurality of micro-chambers 2 through the plurality of microchannels 3.

In some embodiments, fluids of different colors may be driven in and out of the plurality of micro-chambers 2 by electroosmotic flow. Accordingly, in some embodiments, the microfluidic color filter further includes a plurality of pairs of positively charged and negatively charged micro-electrodes configured to respectively provide an electroosmotic force sufficient to cause flow of fluid in the plurality of micro-channels 3.

In some embodiments, each of the plurality of microfluidic color filter units 1 includes one of the plurality of micro-chambers 2, and at least two of the plurality of micro-channels 3 configured to be connected to the one of the plurality of micro-chambers 2. Optionally, the at least two of the plurality of micro-channels 3 are configured to provide amounts of fluids of different colors to the one of the plurality of micro-chambers 2. A color of each of the plurality of microfluidic color filter units 1 is based on the amounts of fluids of different colors provided to the one of the plurality of micro-chambers 2. In one example, the color of each of the plurality of microfluidic color filter units 1 is based on a ratio of fluids of different colors provided to the one of the plurality of micro-chambers 2.

In some embodiments, each of the plurality of microfluidic color filter units 1 further includes at least two micro-pumps configured to control amounts of fluids of different colors respectively provided from the at least two of the plurality of micro-channels 3 to the one of the plurality of micro-chambers 2.

In some embodiments, each of the plurality of microfluidic color filter units 1 further includes at least two pairs of the plurality of pairs of positively charged and negatively charged micro-electrodes. The at least two pairs of the plurality of pairs of positively charged and negatively charged micro-electrodes are configured to control amounts of fluids of different colors respectively provided from the at least two of the plurality of micro-channels 3 to the one of the plurality of micro-chambers 2.

Figure 2:
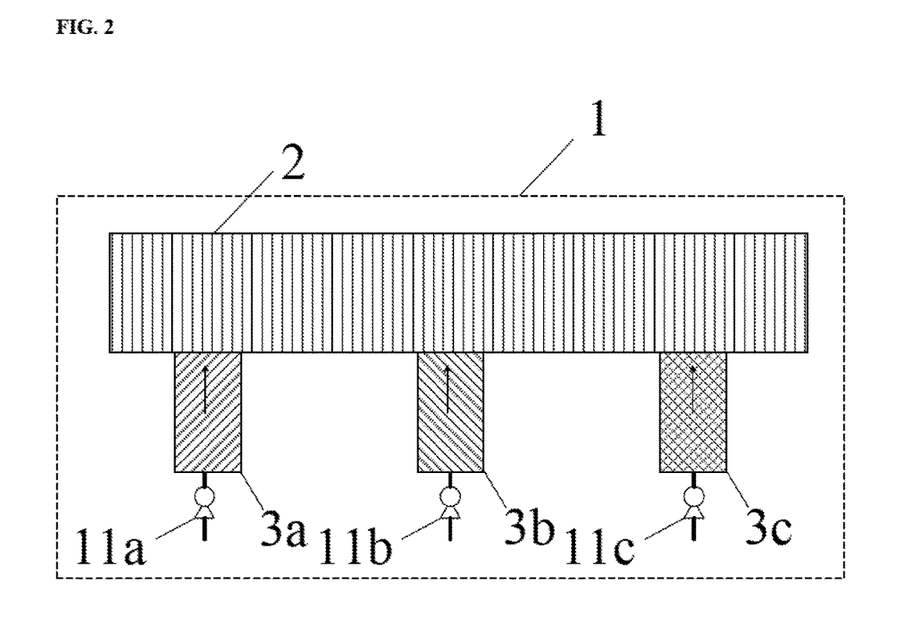
FIG. 2 is a schematic diagram illustrating the structure of a microfluidic color filter unit in some embodiments according to the present disclosure.

FIG. 2 is a schematic diagram illustrating the structure of a microfluidic color filter unit 1 in some embodiments according to the present disclosure. Referring to FIG. 2, each of the plurality of microfluidic color filter units 1 in some embodiments includes a single one of the plurality of micro-chambers 2; and a first micro-channel 3a, a second micro channel 3b, and a third micro channel 3c of the plurality of micro-channels 3. The first micro-channel 3a, the second micro channel 3b, and the third micro channel 3c are configured to be respectively connected to the single one of the plurality of micro-chambers 2. The first micro-channel 3a is configured to provide a first amount of a first fluid of a first color to the single one of the plurality of micro-chambers 2, the second micro-channel 3b is configured to provide a second amount of a second fluid of a second color to the single one of the plurality of micro-chambers 2, and the third micro-channel 3c is configured to provide a third amount of a third fluid of a third color to the single one of the plurality of micro-chambers 2. A color of each of the plurality of microfluidic color filter units 1 is based on the first amount, the second amount, and the third amount. Optionally, the color of each of the plurality of microfluidic color filter units 1 is based on a ratio among the first amount, the second amount, and the third amount.

Referring to FIG. 2, the microfluidic color filter unit 1 in some embodiments includes a first micro-pump 11a, a second micro-pump 11b, and a third micro-pump 11c. The first micro-pump 11a is configured to control the first amount of the first fluid of the first color provided from the first micro-channel 3a to the single one of the plurality of micro-chambers 2. The second micro-pinup 11b is configured to control the second amount of the second fluid of the second color provided from the second micro-channel 3b to the single one of the plurality of micro-chambers 2. The third micro-pump 11c is configured to control the third amount of the third fluid of the third color provided from the third micro-channel 3c to the single one of the plurality of micro-chambers 2. Optionally, the microfluidic color filter unit 1 further includes a plurality of micro-valves configured to control the flow of fluids through the plurality of micro-channels. For example, the microfluidic color filter unit 1 in some embodiments includes a first micro-valve connected between the first micro-pump 11a and the first micro-channel 3a, a second micro-valve connected between the second micro-pump 11b and the second micro-channel 3b, and a third micro-valve connected between third micro-pump 11c and the third micro-channel 3c. The first micro-valve, the second micro-valve, and the third micro-valve can be individually actuated so that flow rates of the first fluid of the first color, the second fluid of the second color, and the third fluid of the third color can be individually adjusted (e.g., from zero to a value greater than zero). As a result, the first amount of the first fluid of the first color provided to the single one of the plurality of micro-chambers 2 through the first micro-channel 3a, the second amount of the second amount of the second fluid of the second color provided to the single one of the plurality of micro-chambers 2 through the second micro-channel 3b, and the third amount of the third fluid of the third color provided to the single one of the plurality of micro-chambers 2 through the third micro-channel 3c, and the ratio among the first amount, the second amount, and the third amount can be controlled.

In some embodiments, the first micro-pump 11a, the second micro-pump 11b, and the third micro-pump 11c are actuated by electrical signals. Optionally, each of the plurality of microfluidic color filter units 1 further includes a first electrical signal generator, a second electrical signal generator, and a third electrical signal generator. Optionally, the first electrical signal generator, the second electrical signal generator, and the third electrical signal generator are connected to a data line of a corresponding pixel. Optionally, the electrical signal generators are configured to convert a data signal transmitted from the data line into electrical signals, e.g., a first electrical signal, a second electrical signal, and a third electrical signal. By applying the first electrical signal to the first micro-pump 11a, the first amount of the first fluid of the first color provided to the single one of the plurality of micro-chambers 2 through the first micro-channel 3a may be controlled. By applying the second electrical signal to the second micro-pump 11b, the second amount of the second fluid of the second color provided to the single one of the plurality of micro-chambers 2 through the second micro-channel 3b may be controlled. By applying the third electrical signal to the third micro-pump 11c, the third amount of the third fluid of the third color provided to the single one of the plurality of micro-chambers 2 through the third micro-channel 3c may be controlled.

Figure 3:
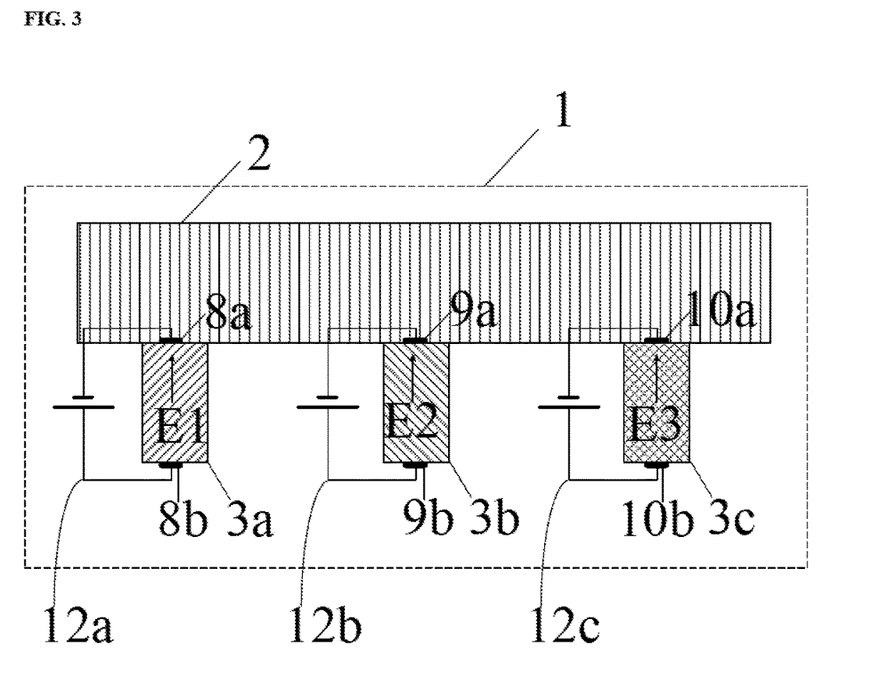
FIG. 3 is a schematic diagram illustrating the structure of a microfluidic color filter unit in some embodiments according to the present disclosure.

FIG. 3 is a schematic diagram illustrating the structure of a microfluidic color filter unit 1 in some embodiments according to the present disclosure. Referring to FIG. 3, in some embodiments, each of the plurality of microfluidic color filter units 1 includes a first electroosmotic circuit 12a, a second electroosmotic circuit 12b, and a third electroosmotic circuit 12c. The first electroosmotic circuit 12a includes a first pair of micro-electrodes 8a and 8b. The second electroosmotic circuit 12b includes a second pair of micro-electrodes 9a and 9b. The third electroosmotic circuit 12c includes a third pair of micro-electrodes 10a and 10b. Each of the first pair of micro-electrodes 8a and 8b, the second pair of micro-electrodes 9a and 9b, and the third pair of micro-electrodes 10a and 10b is a pair of positively charged and negatively charged micro-electrodes. The first pair of micro-electrodes 8a and 8b is configured to control the first amount of the first fluid of the first color provided from the first micro-channel 3a to the single one of the plurality of micro-chambers 2. The second pair of micro-electrodes 9a and 9b is configured to control the second amount of the second fluid of the second color provided from the second micro-channel 3b to the single one of the plurality of micro-chambers 2. The third pair of micro-electrodes 10a and 10b is configured to control the third amount of the third fluid of the third color provided from the third micro-channel 3c to the single one of the plurality of micro-chambers 2.

As shown in FIG. 3, the first pair of micro-electrodes 8a and 8b is configured to generate an electrical field E1 in the first micro-channel 3a, the electrical field E1 provides an electroosmotic force sufficient to cause flow of fluid in the first micro-channel 3a. The second pair of micro-electrodes 9a and 9b is configured to generate an electrical field E2 in the second micro-channel 3b, the electrical field E2 provides an electroosmotic force sufficient to cause flow of fluid in the second micro-channel 3b. The third pair of micro-electrodes 10a and 10b is configured to generate an electrical field E3 in the third micro-channel 3c, the electrical field E3 provides an electroosmotic force sufficient to cause flow of fluid in the third micro-channel 3c. The magnitudes of the electrical field E1, the electrical field E2, and the electrical field E3 can be individually adjusted (e.g., from zero to a value greater than zero). As a result, the first amount of the first fluid of the first color provided to the single one of the plurality of micro-chambers 2 through the first micro-channel 3a, the second amount of the second amount of the second fluid of the second color provided to the single one of the plurality of micro-chambers 2 through the second micro-channel 3b, and the third amount of the third fluid of the third color provided to the single one of the plurality of micro-chambers 2 through the third micro-channel 3c, and the ratio among the first amount, the second amount, and the third amount can be controlled.

In some embodiments, the first electroosmotic circuit 12a includes a first electrical signal generator, the second electroosmotic circuit 12b includes a second electrical signal generator, and the third electroosmotic circuit 12c includes a third electrical signal generator. Optionally, the first electroosmotic circuit 12a, the second electroosmotic circuit 12b, and the third electroosmotic circuit 12c are connected to a data line of a corresponding pixel. Optionally, the electrical signal generators are configured to convert a data signal transmitted from the data line into electrical signals, e.g., a first electrical signal, a second electrical signal, and a third electrical signal. By applying the first electrical signal to the first pair of micro-electrodes 8a and 8b, the electrical field E1 may be generated in the first micro-channel 3a, and the first amount of the first fluid of the first color provided to the single one of the plurality of micro-chambers 2 through the first micro-channel 3a may be controlled. By applying the second electrical signal to the second pair of micro-electrodes 9a and 9b, the electrical field E2 may be generated in the second micro-channel 3b, and the second amount of the second fluid of the second color provided to the single one of the plurality of micro-chambers 2 through the second micro-channel 3b may be controlled. By applying the third electrical signal to the third pair of micro-electrodes 10a and 10b, the electrical field E3 may be generated in the third micro-channel 3c, and the third amount of the third fluid of the third color provided to the single one of the plurality of micro-chambers 2 through the third micro-channel 3c may be controlled.

Accordingly, by applying different electrical fields to different micro-channels, the flow rates in each micro-channel may be controlled to be different. The electroosmotic flow rate can be determined based on the following Equation:

$$\text{flow rate} = -\frac{E\varepsilon\varepsilon 0\zeta}{\eta}; \quad (1)$$

wherein E is the electric field (e.g., equal to the voltage divided by the distance between the pair of electrodes for micro-channels having uniform resistance per unit length); $\varepsilon$ is the relative permittivity of liquid, $\varepsilon 0$ is the permittivity of free space, $\zeta$ is the zeta potential of the micro-channel/liquid interface; and $\eta$ is the liquid viscosity.

In some embodiments, each of the plurality of micro-chambers 2 has an outlet for discharging the fluid in the micro-chamber. For example, the fluid in the micro-chamber may be discharged to waste. Optionally, the fluid in the plurality of micro-chambers 2 is continuously recycled for use in the microfluidic color filter. For example, the fluid in the plurality of micro-chambers 2 may be first discharged to a recycling device. Referring to FIG. 1, the microfluidic color filter in some embodiments further includes a recycling device 7 configured to separate a mixture of the fluids of different colors into separated fluids of different colors, and recycle the separated fluids of different colors for use in the plurality of micro-chambers 2.

Examples of recycling devices include an ion separation device such as a membrane separation device. For example, the recycling device 7 may include one or more membranes each having a different average pore size suitable for selectively separating a specific ion or a group of ions. In some embodiments, the recycling device 7 include an electro-dialysis device, an electro-dialysis reversal device, or both. The electro-dialysis device or the electro-dialysis reversal device includes one or more semi-permeable membrane, through which ions may be transported under the influence of an electrical potential. The membranes in the electro-dialysis device or the electro-dialysis reversal device may be cation-selective or anion-selective respectively for allowing positive ions or negative ions to pass through. In some embodiments, the recycling device 7 include a fractional precipitation device for selectively precipitate one or more ions in the fluid thereby separating one ion from another. For example, a fluid containing a mixture of copper ion and ferric ion may be treated with an alkaline solution containing hydroxide, the ferric ion can be selectively precipitated out in a pH range of 10 to 11 while the copper ion remains in the solution. The precipitated ferric material (e.g., ferric hydroxide) can be dissolved using an acid. The separated copper solution and ferric solution can be recycled as fluids for color filtering (e.g., as a red color solution and a blue color solution). In some embodiments, the recycling device 7 includes one or more devices selected from the group including a membrane separation device, an electro-dialysis device, an electro-dialysis reversal device, and a fractional precipitation device. The recycling device 7 may be disposed in a peripheral region of the microfluidic color filter. Optionally, the recycling device 7 is disposed in a peripheral region of the display panel having the microfluidic color filter.

In some embodiments, each of the plurality of microfluidic color filter units 1 further includes a fourth micro-channel configured to be connected to the single one of the plurality of micro-chambers 2 and configured to provide a transparent fluid to the single one of the plurality of micro-chambers 2. For example, when a pixel corresponding to one of the plurality of microfluidic color filter units 1 is configured to emit white light, the fourth micro-channel is configured to provide the transparent fluid to the one of the plurality of micro-chambers 2 corresponding to the pixel. The transparent fluid may be an air or a transparent liquid such as water or any insert transparent liquid.

In some embodiments, the microfluidic color filter unit 1 further includes a fourth micro-pump configured to control the amount of the transparent fluid provided from the fourth micro-channel to the single one of the plurality of micro-chambers 2. Optionally, the microfluidic color filter unit 1 further includes a fourth micro-valve configured to control the flow of the transparent fluid through the fourth micro-channel. Optionally, the fourth micro-valve is disposed between the fourth micro-channel and the fourth micro-pump, and can be actuated so that a flow rate of the transparent fluid can be adjusted (e.g., from zero to a value greater than zero).

In some embodiments, the microfluidic color filter unit 1 further includes a fourth pair of micro-electrodes configured to control a fourth amount of a transparent fluid provided from the fourth micro-channel to the single one of the plurality of micro-chambers 2. The fourth pair of micro-electrodes is a pair of positively charged and negatively charged micro-electrodes configured to generate an electrical field in the fourth micro-channel. The magnitude of the electrical field can be individually adjusted (e.g., from zero to a value greater than zero) to control the fourth amount of a transparent fluid provided from the fourth micro-channel to the single one of the plurality of micro-chambers 2.

Referring to FIG. 1, the microfluidic color filter in some embodiments further includes a transparent base substrate 6 and a microfluidic chip 5 on the transparent base substrate 6 configured to be connected to the plurality of micro-channels 3.

In some embodiments, the first color, the second color, and the third color are three primary colors. Optionally, the first color, the second color, and the third color are three different colors selected from red, green, and blue. Optionally, the first color, the second color, and the third color are three different colors selected from yellow, cyan, and magenta.

Various appropriate fluids of color may be used in the present microfluidic color filter. Examples of fluids of red color include, but are not limited to, solutions containing iron(III) thiocyanate. Examples of fluids of green color include, but are not limited to, solutions containing ferrous iron, copper (II) tetrachloro complex ($CuCl_4^{2-}$), vanadium (III), chromium (III), manganate (VI), and nickel (II). Examples of fluids of blue color include, but are not limited to, solutions containing copper(II) ion, vanadyl (IV), manganate (V), and copper (II) ammine complex ($Cu(NH_3)_4^{2+}$). Examples of fluids of color also include various solutions of organic compounds such as organic dyes having an appropriate color, e.g., a red color, a green color, or a blue color. Optionally, the fluids of color are formulated to have a certain viscosity so that the fluids may be driven under the electroosmotic force. Because the fluids have the certain viscosity, the movement of ions under the influence of the electrical field causes the surrounding solvent to move along with the ions, resulting in electroosmotic flow.

In another aspect, the present disclosure provides a display panel having a plurality of pixels. In some embodiments, the display panel includes a microfluidic color filter described herein, and an array substrate facing the microfluidic color filter. Optionally, each of the plurality of pixels includes a single one of the plurality of microfluidic color filter units, e.g., each pixel includes a single micro-chamber. Optionally, the display panel is a liquid crystal display panel.

In another aspect, the present disclosure provides a display apparatus having the display panel described herein. Examples of appropriate display apparatuses include, but are not limited to, an electronic paper, a mobile phone, a tablet computer, a television, a monitor, a notebook computer, a digital album, a GPS, etc.

In another aspect, the present disclosure provides a method of controlling a display panel having a plurality of pixels. In some embodiments, the method includes providing a plurality of micro-chambers in an image display area of the display panel, each of the plurality of pixels including one of the plurality of micro-chambers; and providing at least one of fluids of different colors to the one of the plurality of micro-chambers. Fluids of different colors may be provided to each of the plurality of micro-chambers in differing ratios for color image display. A color of light emitted from the pixel corresponding to the one of the plurality of micro-chambers is based on amounts of fluids of different colors provided to the one of the plurality of micro-chambers. For example, when a pixel corresponding to one of the plurality micro-chambers is configured to emit light of cyan color, a fluid of green color and a fluid of blue color may be provided to the one of the plurality of micro-chambers in a certain ratio, e.g., a 1:1 ratio. In different frames of image, fluids of different colors in different ratios may be respectively provided to the micro-chamber. Optionally, the pixel corresponding to the one of the plurality of micro-chambers is configured to emit light of different colors in the first frame of image and the second frame of image, and the amounts of fluids of different colors provided to the one of the plurality of micro-chambers have a first ratio in the first frame of image and a second ratio in the second frame of image.

In some embodiments, the fluids of different colors include a first fluid of a first color, a second fluid of a second color, and a third fluid of a third color. Optionally, the step of providing at least one of fluids of different colors includes controlling a first amount of the first fluid of the first color provided to the one of the plurality of micro-chambers; controlling a second amount of the second fluid of the second color provided to the one of the plurality of micro-chambers; and controlling a third amount of the third fluid of the third color provided to the one of the plurality of micro-chambers. A color of light emitted from the one of the plurality of pixels corresponding to the one of the plurality of micro-chambers is based on the first amount, the second amount, and the third amount. Optionally, the pixel corresponding to the one of the plurality of micro-chambers is configured to emit light of different colors in the first frame of image and the second frame of image, and a ratio among the first amount, the second amount, and the third amount has a first value in the first frame of image and a second value in the second frame of image.

Fluids of different colors may be driven in and out of the plurality of micro-chambers by various appropriate methods. In some embodiments, fluids of different colors may be driven in and out of the plurality of micro-chambers by mechanical methods, e.g., by a plurality of micro-pumps. In some embodiments, the step of controlling the first amount of the first fluid includes providing the first fluid of the first color through a first micro-channel connected to the one of the plurality of micro-chambers, and applying a first pressure to the first micro-channel to control the first amount; the step of controlling the second amount of the second fluid includes providing the second fluid of the second color through a second micro-channel connected to the one of the plurality of micro-chambers, and applying a second pressure to the second micro-channel to control the second amount; and the step of controlling the third amount of the third fluid includes providing the third fluid of the third color through a third micro-channel connected to the one of the plurality of micro-chambers, and applying a third pressure to the third micro-channel to control the third amount.

In some embodiments, the method further includes receiving a data signal corresponding to the pixel having the one of the plurality of micro-chambers, and converting the data signal into a plurality of electrical signals, e.g., a first electrical signal, a second electrical signal, and a third electrical signal. Optionally, the method further includes applying the first electrical signal to a first micro-pump to generate the first pressure in the first micro-channel; applying the second electrical signal to a second micro-pump to generate the second pressure in the second micro-channel; and applying the third electrical signal to a third micro-pump to generate the third pressure in the third micro-channel.

In some embodiments, fluids of different colors may be driven in and out of the plurality of micro-chambers by electroosmotic flow. Optionally, fluids of different colors may be driven in and out of the plurality of micro-chambers under the influence of an electrical field configured to provide an electroosmotic force sufficient to cause flow of fluid. In some embodiments, the step of controlling the first amount of the first fluid includes providing the first fluid of the first color through a first micro-channel connected to the one of the plurality of micro-chambers, and applying a first electrical field to the first micro-channel to control the first amount; the step of controlling the second amount of the second fluid includes providing the second fluid of the second color through a second micro-channel connected to the one of the plurality of micro-chambers, and applying a second electrical field to the second micro-channel to control the second amount; and the step of controlling the third amount of the third fluid includes providing the third fluid of the third color through a third micro-channel connected to the one of the plurality of micro-chambers, and applying a third electrical field to the third micro-channel to control the third amount.

In some embodiments, the method further includes receiving a data signal corresponding to the pixel having the one of the plurality of micro-chambers, and converting the data signal into a plurality of electrical signals, e.g., a first electrical signal, a second electrical signal, and a third electrical signal. Optionally, the method further includes applying the first electrical signal to a first pair of micro-electrodes to generate the first electrical field in the first micro-channel; applying the second electrical signal to a second pair of micro-electrodes to generate the second electrical field in the second micro-channel; and applying the third electrical signal to a third pair of micro-electrodes to generate the third electrical field in the third micro-channel.

In some embodiments, subsequent to the first frame of image and prior to the second frame of image, the method further includes discharging fluids provided to the one of the plurality of micro-chambers during the first frame of image. For example, the fluid in the micro-chamber may be discharged to waste. Optionally, the fluid in the plurality of micro-chambers is continuously recycled for use in the microfluidic color filter. In one example, the fluids provided to the one of the plurality of micro-chambers during the first frame of image are a mixture of the fluids of different colors, and the method further includes separating the mixture of the fluids of different colors into separated fluids of different colors; and recycling the separated fluids of different colors for use in the one of the plurality of micro-chambers.

Optionally, the step of separating the mixture of the fluids of different colors is performed by ion separation to separate ions having different colors. Optionally, the step of separating the mixture of the fluids of different colors is performed by membrane ion separation using one or more membranes each having a different average pore size suitable for selectively separating a specific ion or a group of ions. Optionally, the step of separating the mixture of the fluids of different colors is performed by electro-dialysis, reversal electro-dialysis, or both, using one or more semi-permeable membrane, through which ions may be transported under the influence of an electrical potential. The membranes in the electro-dialysis device or the electro-dialysis reversal device may be cation-selective or anion-selective respectively for allowing positive ions or negative ions to pass through. Optionally, the step of separating the mixture of the fluids of different colors is performed by fractional precipitation for selectively precipitate one or more ions in the fluid thereby separating one ion from another. In some embodiments, the step of separating the mixture of the fluids of different colors is performed by one or more methods selected from the group including membrane separation, electro-dialysis, reversal electro-dialysis, and fractional precipitation.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A microfluidic color filter having an array of a plurality of microfluidic color filter units, comprising:
a plurality of micro-chambers; and a plurality of micro-channels;
wherein each of the plurality of microfluidic color filter units comprises:
one of the plurality of micro-chambers; and
at least two of the plurality of micro-channels respectively connected to the one of the plurality of micro-chambers;
wherein the at least two of the plurality of micro-channels are configured to provide fluids of different colors to the one of the plurality of micro-chambers; and
a color of each of the plurality of microfluidic color filter units is based on amounts of fluids of different colors provided to the one of the plurality of micro-chambers;
wherein each of the plurality of microfluidic color filter units comprises:
a single one of the plurality of micro-chambers; and
a first micro-channel, a second micro channel, and a third micro channel of the plurality of micro-channels, the first micro-channel, the second micro channel, and the third micro channel being configured to be respectively connected to the single one of the plurality of micro-chambers;
wherein the first micro-channel is configured to provide a first amount of a first fluid of a first color to the single one of the plurality of micro-chambers;
the second micro-channel is configured to provide a second amount of a second fluid of a second color to the single one of the plurality of micro-chambers;
the third micro-channel is configured to provide a third amount of a third fluid of a third color to the single one of the plurality of micro-chambers; and
a color of each of the plurality of microfluidic color filter units is based on the first amount, the second amount, and the third amount;
wherein the first color, the second color, and the third color are three different colors selected from red, green, and blue;
wherein the first fluid of the first color comprises iron(III) thiocyanate; the second fluid of the second color comprises ferrous iron; and the third fluid of the third color comprises copper(II) ion.

2. The microfluidic color filter of claim 1, further comprising:
a plurality of pairs of positively charged and negatively charged micro-electrodes configured to respectively provide electroosmotic forces sufficient to cause flow of fluids in the plurality of micro-channels;
wherein each of the plurality of microfluidic color filter units further comprises at least two pairs of the plurality of pairs of positively charged and negatively charged micro-electrodes; and
the at least two pairs of the plurality of pairs of positively charged and negatively charged micro-electrodes are configured to control the amounts of fluids of different colors respectively provided from the at least two of the plurality of micro-channels to the one of the plurality of micro-chambers.

3. The microfluidic color filter of claim 1, wherein each of the plurality of microfluidic color filter units further comprises:
a first pair of micro-electrodes, a second pair of micro-electrodes, and a third pair of micro-electrodes of the plurality of pairs of positively charged and negatively charged micro-electrodes;
wherein the first pair of micro-electrodes is configured to control the first amount of the first fluid of the first color provided from the first micro-channel to the single one of the plurality of micro-chambers;
the second pair of micro-electrodes is configured to control the second amount of the second fluid of the second color provided from the second micro-channel to the single one of the plurality of micro-chambers; and
the third pair of micro-electrodes is configured to control the third amount of the third fluid of the third color provided from the third micro-channel to the single one of the plurality of micro-chambers.

4. The microfluidic color filter of claim 1, wherein each of the plurality of microfluidic color filter units further comprises:
a fourth micro-channel connected to the single one of the plurality of micro-chambers and configured to provide a transparent fluid to the single one of the plurality of micro-chambers.

5. The microfluidic color filter of claim 4, wherein each of the plurality of microfluidic color filter units further comprises:
a fourth pair of micro-electrodes of the plurality of pairs of positively charged and negatively charged micro-electrodes configured to control a fourth amount of the transparent fluid provided from the fourth micro-channel to the single one of the plurality of micro-chambers.

6. The microfluidic color filter of claim 1, further comprising:
a transparent base substrate; and
a microfluidic chip on the transparent base substrate connected to the plurality of micro-channels.

7. The microfluidic color filter of claim 1, further comprising:
a recycling device configured to separate a mixture of the fluids of different colors into separated fluids of different colors;
wherein the separated fluids of different colors are recycled in providing at least one of fluids of different colors to the one of the plurality of micro-chambers.

8. A display panel having a plurality of pixels, comprising:
a microfluidic color filter of claim 1; and
an array substrate facing the microfluidic color filter;
wherein each of the plurality of pixels comprising a single one of the plurality of microfluidic color filter units.

9. A display apparatus, comprising the display panel of claim 8.

10. A method of controlling a display panel having a plurality of pixels, comprising:
providing a plurality of micro-chambers in an image display area of the display panel, each of the plurality of pixels comprising one of the plurality of micro-chambers; and
providing at least one of fluids of different colors to the one of the plurality of micro-chambers;
wherein a color of light emitted from the one of the plurality of pixels corresponding to the one of the plurality of micro-chambers is based on amounts of fluids of different colors provided to the one of the plurality of micro-chambers;
controlling the first amount of the first fluid comprises providing the first fluid of the first color through a first micro-channel connected to the one of the plurality of micro-chambers, and applying a first electrical field to the first micro-channel to control the first amount by electroosmotic flow;

controlling the second amount of the second fluid comprises providing the second fluid of the second color through a second micro-channel connected to the one of the plurality of micro-chambers, and applying a second electrical field to the second micro-channel to control the second amount by electroosmotic flow; and controlling the third amount of the third fluid comprises providing the third fluid of the third color through a third micro-channel connected to the one of the plurality of micro-chambers, and applying a third electrical field to the third micro-channel to control the third amount by electroosmotic flow;

wherein the first color, the second color, and the third color are three different colors selected from red, green, and blue;

wherein the first fluid of the first color comprises iron(III) thiocyanate; the second fluid of the second color comprises ferrous iron; and the third fluid of the third color comprises copper(II) ion.

11. The method of claim 10, wherein the fluids of different colors comprise a first fluid of a first color, a second fluid of a second color, and a third fluid of a third color;

providing at least one of fluids of different colors comprises:

controlling a first amount of the first fluid of the first color provided to the one of the plurality of micro-chambers;

controlling a second amount of the second fluid of the second color provided to the one of the plurality of micro-chambers; and controlling a third amount of the third fluid of the third color provided to the one of the plurality of micro-chambers;

wherein a color of light emitted from the one of the plurality of pixels corresponding to the one of the plurality of micro-chambers is based on the first amount, the second amount, and the third amount.

12. The method of claim 11, wherein the first fluid, the second fluid, and the third fluid are respectively dispensed into the one of the plurality of micro-chambers by electroosmotic flow.

13. The method of claim 10, further comprising:

receiving a data signal;

converting the data signal to a first electrical signal, a second electrical signal, and a third electrical signal;

applying the first electrical signal to a first pair of micro-electrodes to generate the first electrical field in the first micro-channel;

applying the second electrical signal to a second pair of micro-electrodes to generate the second electrical field in the second micro-channel; and applying the third electrical signal to a third pair of micro-electrodes to generate the third electrical field in the third micro-channel.

14. The method of claim 10, wherein the display panel is configured to display a first frame of image and a second frame of image;

the one of the plurality of pixels corresponding to the one of the plurality of micro-chambers is configured to emit light of different colors in the first frame of image and the second frame of image; and the amounts of fluids of different colors provided to the one of the plurality of micro-chambers have a first ratio in the first frame of image and a second ratio in the second frame of image.

15. The method of claim 14, subsequent to the first frame of image and prior to the second frame of image, further comprising discharging fluids provided to the one of the plurality of micro-chambers during the first frame of image.

16. The method of claim 15, wherein the fluids provided to the one of the plurality of micro-chambers during the first frame of image are a mixture of the fluids of different colors;

the method further comprising separating the mixture of the fluids of different colors into separated fluids of different colors; and recycling the separated fluids of different colors in providing at least one of fluids of different colors to the one of the plurality of micro-chambers.

* * * * *